US 11,602,998 B2

United States Patent
Sullivan et al.

(10) Patent No.: US 11,602,998 B2
(45) Date of Patent: Mar. 14, 2023

(54) ELECTRIFIED VEHICLE WHEEL SPEED CONTROL USING HEAVE WHEN TRAVERSING DEFORMABLE TERRAIN

(71) Applicant: Ford Global Technologies, LLC, Dearborn, MI (US)

(72) Inventors: Jonathan Sullivan, Ferndale, MI (US); Kevin Mackenzie, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 17/142,029

(22) Filed: Jan. 5, 2021

(65) Prior Publication Data

US 2022/0212543 A1  Jul. 7, 2022

(51) Int. Cl.
*B60L 15/20* (2006.01)
*B60L 3/10* (2006.01)

(52) U.S. Cl.
CPC ............... *B60L 15/20* (2013.01); *B60L 3/106* (2013.01); *B60L 2240/16* (2013.01); *B60L 2240/421* (2013.01); *B60L 2240/423* (2013.01); *B60L 2240/461* (2013.01); *B60L 2240/465* (2013.01); *B60L 2260/28* (2013.01)

(58) Field of Classification Search
CPC ...... B60L 15/20; B60L 3/106; B60L 2240/16; B60L 2240/421; B60L 2240/423; B60L 2240/461; B60L 2240/465; B60L 2260/28; Y02T 10/62; Y02T 10/64; Y02T 10/72

See application file for complete search history.

(56) References Cited

U.S. PATENT DOCUMENTS

| 8,005,592 B2 | 8/2011 | Lu |
| 9,533,684 B2 | 1/2017 | Kelly et al. |
| 9,796,383 B2 | 10/2017 | Fairgrieve et al. |
| 2015/0217766 A1* | 8/2015 | Kelly .................. B60W 10/184 701/94 |

OTHER PUBLICATIONS

Ivano et al.; Wheel slip control for all-wheel drive electric vehicle with compensation of road disturbances; Journal of Terramechanics 61 (2015); pp. 1-10 (Year: 2015).*
Yamakawa et al.; A method of torque control for independent wheel drive vehicles on rough terrain; Journal of Terramechanics 44 (2007); pp. 371-381 (Year: 2007).*

\* cited by examiner

*Primary Examiner* — Michael J Zanelli
(74) *Attorney, Agent, or Firm* — Brooks Kushman PC; David Kelley

(57) ABSTRACT

An electrified vehicle, system, and method include an electric machine, a traction battery coupled to the electric machine, and a controller programmed to control wheel slip to provide high wheel slip to traverse deformable terrain, such as sand and loose soil, and lower wheel slip to avoid excessive soil removal beneath the wheels after detecting a vertical acceleration or heave event, such as after landing when driving over a jump or bump. When vehicle vertical acceleration exceeds a first threshold, and a ratio of a wheel angular acceleration to vehicle longitudinal acceleration exceeds a second threshold, the electric machine is controlled to limit wheel slip to a lower value that provides sufficient tractive force to maintain some forward motion. Otherwise, the electric machine is controlled to limit wheel slip to a higher value to accommodate higher vehicle speeds over the deformable terrain.

20 Claims, 4 Drawing Sheets

ELECTRIFIED VEHICLE WHEEL SPEED CONTROL USING HEAVE WHEN TRAVERSING DEFORMABLE TERRAIN

TECHNICAL FIELD

This disclosure relates to control of an electric machine in an electrified vehicle using vertical acceleration or heave when traversing deformable terrain.

BACKGROUND

Various off-road vehicle driving scenarios may result in wheel spin when going over a large bump or small jump or when cresting a steep incline or hill. While some wheel slip is generally needed when driving over deformable terrain, such as sand dunes or other loose soil, to maintain forward momentum, uncontrolled wheel spin can quickly remove soil beneath the wheel without propelling the vehicle forward. This may result in the vehicle axle and/or skid plate contacting the terrain and further slowing or stopping of the vehicle.

SUMMARY

Embodiments include a vehicle comprising an electric machine, a traction battery coupled to the electric machine, and a controller programmed to, when vehicle vertical acceleration exceeds a first threshold, and a ratio of a wheel angular acceleration to vehicle longitudinal acceleration exceeds a second threshold, control the electric machine to limit wheel slip to a first value, and control the electric machine to limit wheel slip to a second value otherwise. The controller may be further programmed to control speed of the electric machine when limiting the wheel slip to either the first value or the second value. The second value may be greater than the first value. The vehicle may include a front axle having two associated front wheels with the front axle being independently driveable by the electric machine relative to a rear axle having two associated rear wheels. The controller may be programmed to limit the wheel slip of the front axle independently of the wheel slip of the rear axle. The wheel slip for each of the front and rear axles may be based on the higher one of the angular accelerations of the two associated wheels. The controller may be further programmed to lower an overshoot trigger threshold of a wheel speed controller in response to the vehicle vertical acceleration exceeding the first threshold and the wheel angular acceleration exceeding a third threshold, and wherein the controller is programmed to control torque of the electric machine when wheel speed overshoot is less than the overshoot trigger threshold. The controller may be further programmed to control the electric machine to limit the wheel slip to the second value in response to a number of wheel slip events during a predetermined time being less than a corresponding axle stability threshold. The controller may be further programmed to control the electric machine to limit the wheel slip to the first value in response to a normal force indicator being outside a predetermined range of a running average of normal force indicator values. The vehicle may include an engine selectively coupled to the electric machine.

In one or more embodiments, a system includes an electric machine powered by a traction battery to drive vehicle wheels and a controller configured to control speed of the electric machine to control wheel slip speed of at least one of the vehicle wheels to a first target value greater than zero in response to vehicle vertical acceleration indicating a heave event and vehicle longitudinal acceleration being below an acceleration threshold, and control speed of the electric machine to control wheel slip speed of at least one of the vehicle wheels to a second target value greater than the first target value when the heave event is detected and a normal force indicator is within a predetermined range of a running average of normal force indicator values. The controller may be further configured to control torque of the electric machine in response to wheel speed overshoot being less than an associated overshoot threshold. The controller may be further configured to reduce the overshoot threshold in response to the heave event. The wheel slip speed may be based on a ratio of wheel angular acceleration of one of the vehicle wheels to vehicle longitudinal acceleration.

Embodiments may also include a method for controlling an electrified vehicle having an electric machine coupled to a traction battery and configured to drive vehicle wheels. The method may include, by a vehicle controller, for a predetermined time after detecting a heave event, controlling speed of the electric machine to control wheel slip speed of one of the vehicle wheels to a higher target value while a normal force indicator is within a predetermined range, and controlling speed of the electric machine to control wheel slip speed of one of the vehicle wheels to a lower target value greater than zero if the normal force indicator is outside the predetermined range. The method may also include reducing a wheel speed overshoot trigger in response to a wheel speed flare exceeding a threshold. The method may further include controlling torque of the electric machine before detecting a heave event. The normal force indicator may represent downward force on the vehicle wheels. Detection of a heave event may include detecting a heave event in response to vehicle vertical acceleration exceeding an associated threshold. The heave event may be detected only after user input indicative of off-road operation.

Embodiments according to this disclosure may provide associated advantages. For example, this disclosure provides an electrified vehicle, system, and method for controlling wheel speed or slip through heave events to reduce or prevent wheel spin from resulting in axle or skid plate contact with the vehicle that may otherwise result in slowing or stopping of forward motion. Heave-based wheel speed control according to various embodiments may allow a higher trigger threshold for switching to speed control mode to provide greater torque control authority on deformable surfaces for more consistent drivability. Controlling wheel slip to allow higher wheel slip when no heave event is detected, and lower wheel slip greater than zero when heave is detected reduces the opportunity for one or more wheels to dig into the deformable surface and bury the axle. Control of electric machine speed to control wheel slip may provide better results than typical traction control system that drastically reduce torque, which may quickly stop the vehicle when traversing deformable terrain. The control strategy allows non-zero wheel slip over ground speed to maintain forward vehicle motion with electric machine speed control being superior to brake and engine control strategies in most applications.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be desired for particular applications or implementations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, flash devices and/or other solid state storage devices. The processes, methods, or algorithms can also be implemented in a software executable object or code. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, firmware, and software components.

Figure 1:
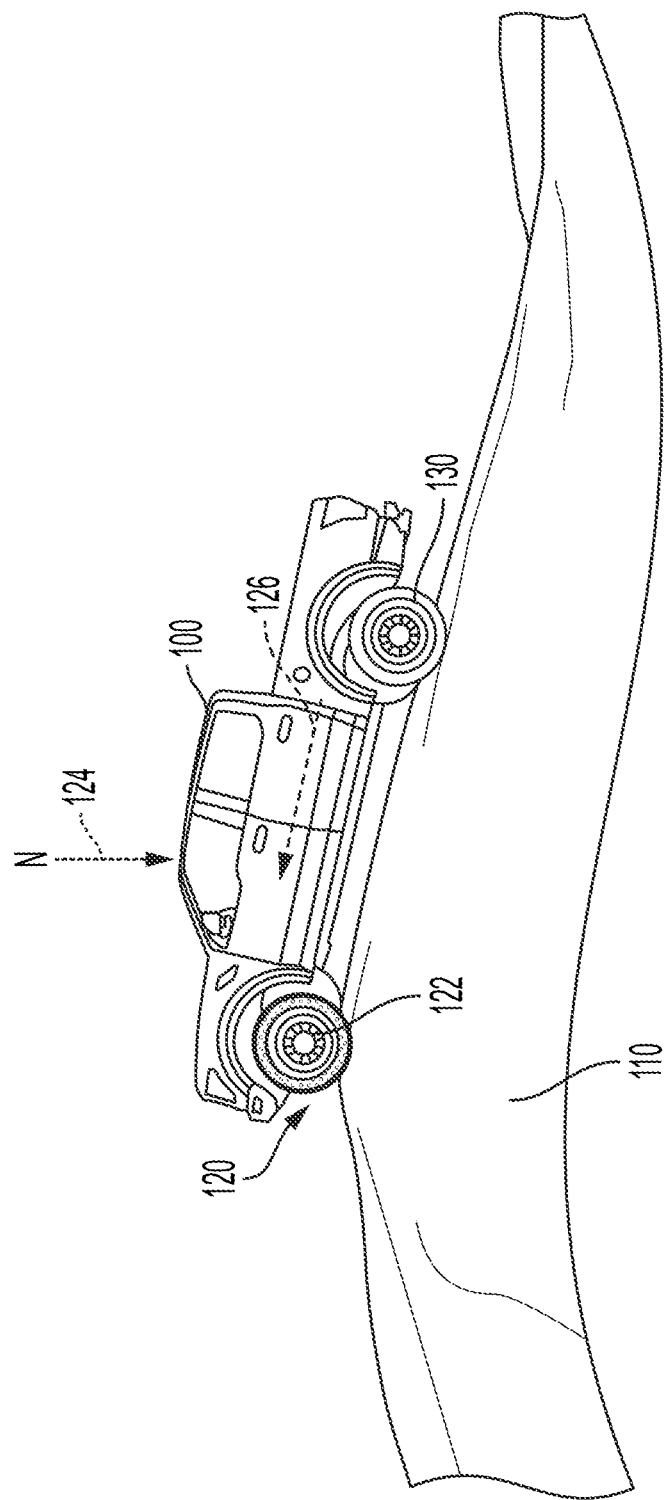
FIG. 1 is a diagram illustrating a representative driving scenario for an electrified vehicle having heave-based wheel speed control.

FIG. 1 is a diagram illustrating a representative driving scenario for an electrified vehicle 100 having heave-based wheel slip speed control as described in greater detail with respect to various representative embodiments herein. When electrified vehicle 100 is driving over deformable terrain 110, such as sand dunes or other loose soil or stones, for example, vehicle 100 may go over a bump or small jump 120 resulting in either or both front axle wheels 122 spinning up (also referred to as a wheel flare) when the normal force (N) 124 on the wheels 122 is reduced by the vehicle suspension and vehicle momentum cresting the jump, bump, or dune. As the vehicle 100 begins to land and compress the suspension, the wheels 122 may create a small hole or ditch upon impact. An uncontrolled wheel with too much or too little load or normal force 124 may quickly remove the soil beneath it without propelling the vehicle forward. This may result in burying of the axle and causing the vehicle skid plates to contact the terrain and slowing and/or stopping of the vehicle.

Typically, when an axle and associated wheels 122 are unloaded after going over a large bump, the powertrain will change from torque control mode to speed control mode to stop the wheel flare. The target wheel speed over ground speed (wheel slip speed) on deformable surfaces like sand is typically high to maintain forward vehicle motion or acceleration 126. During stable conditions, high wheel slip allows the vehicle 100 to accelerate forward at a rate sufficient to escape the hole being dug by the spinning wheel(s). However, during suspension compression and decompression events, the amount of forward acceleration decreases compared to the amount of soil being removed and the depth of the hole created. In various embodiments according to the disclosure, during these events, the wheel slip speed is reduced to a lower wheel slip speed (greater than zero) and torque is delivered to the more stable axle 130.

Figure 2:
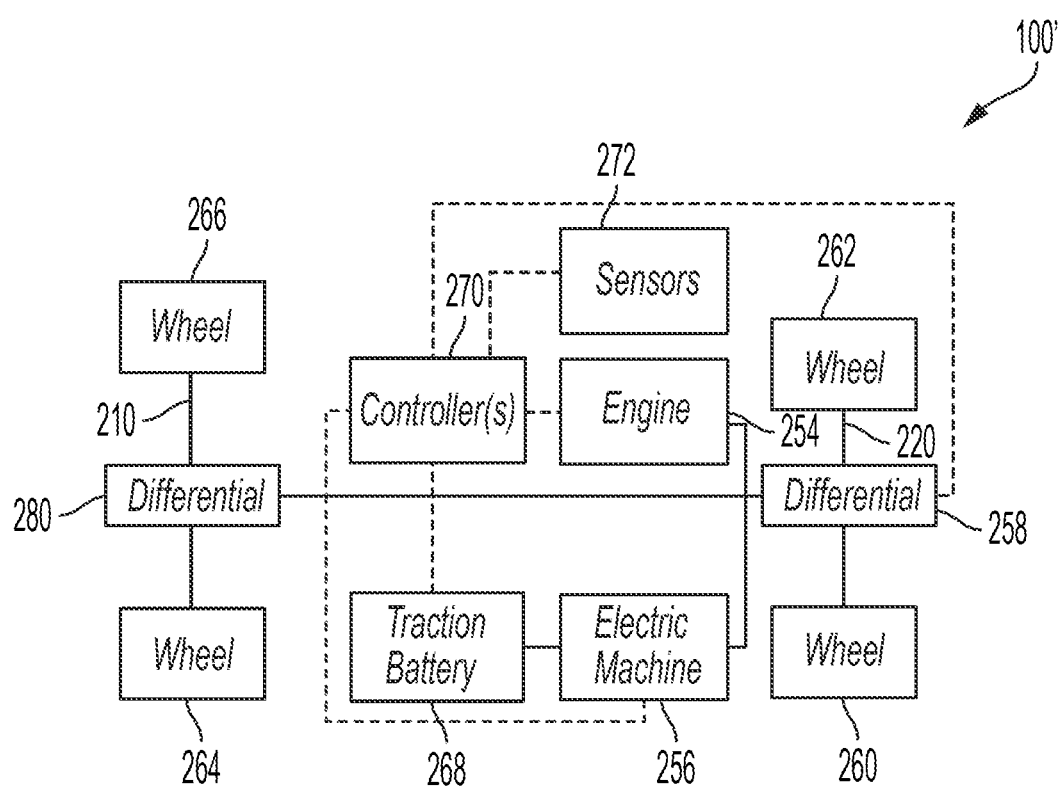
FIG. 2 is a schematic diagram of a representative electrified vehicle.
Figure 3:
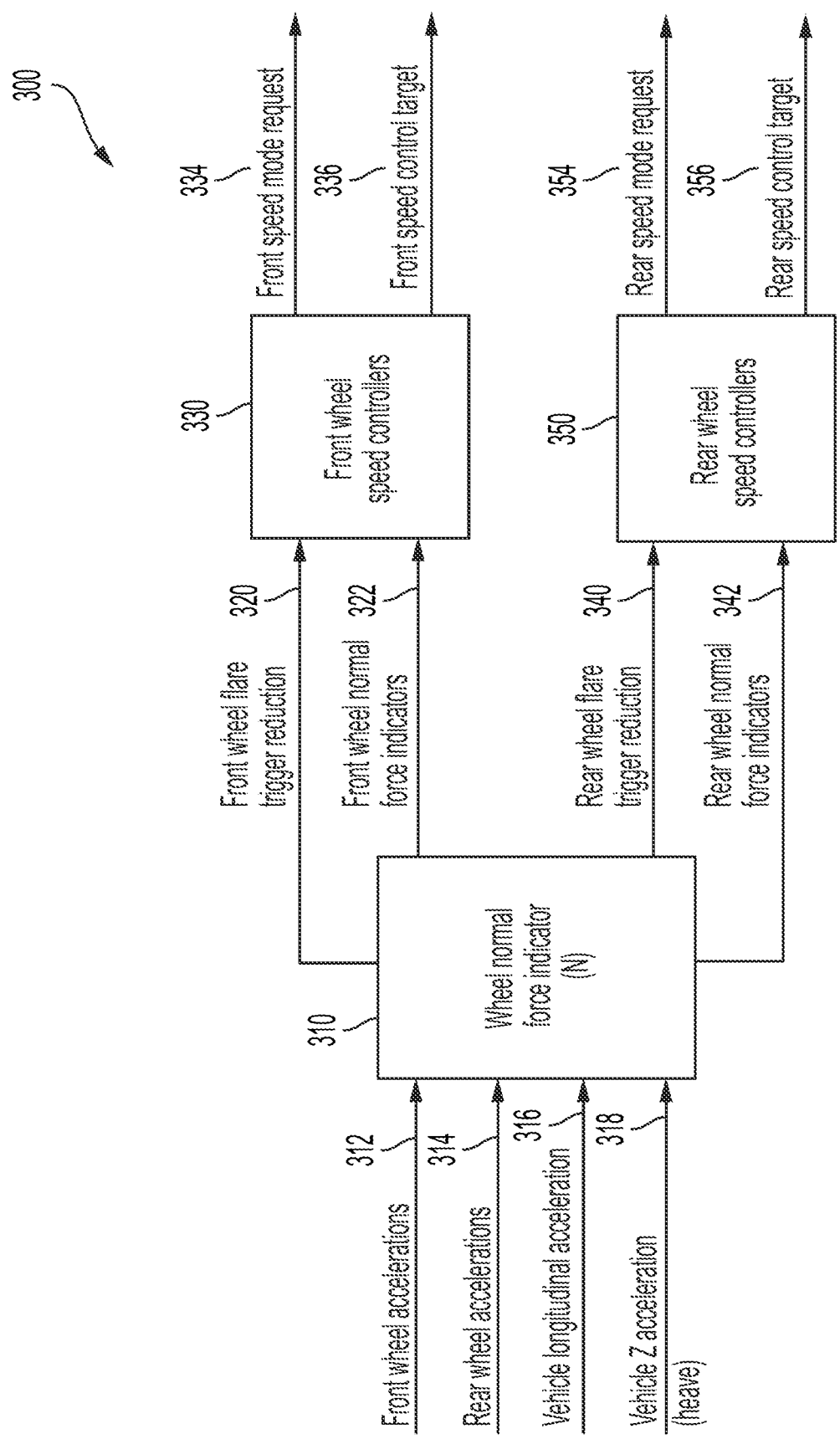
FIG. 3 is a block diagram of a control system for setting speed control targets and triggering speed control mode of an electric machine in an electrified vehicle.
Figure 4:
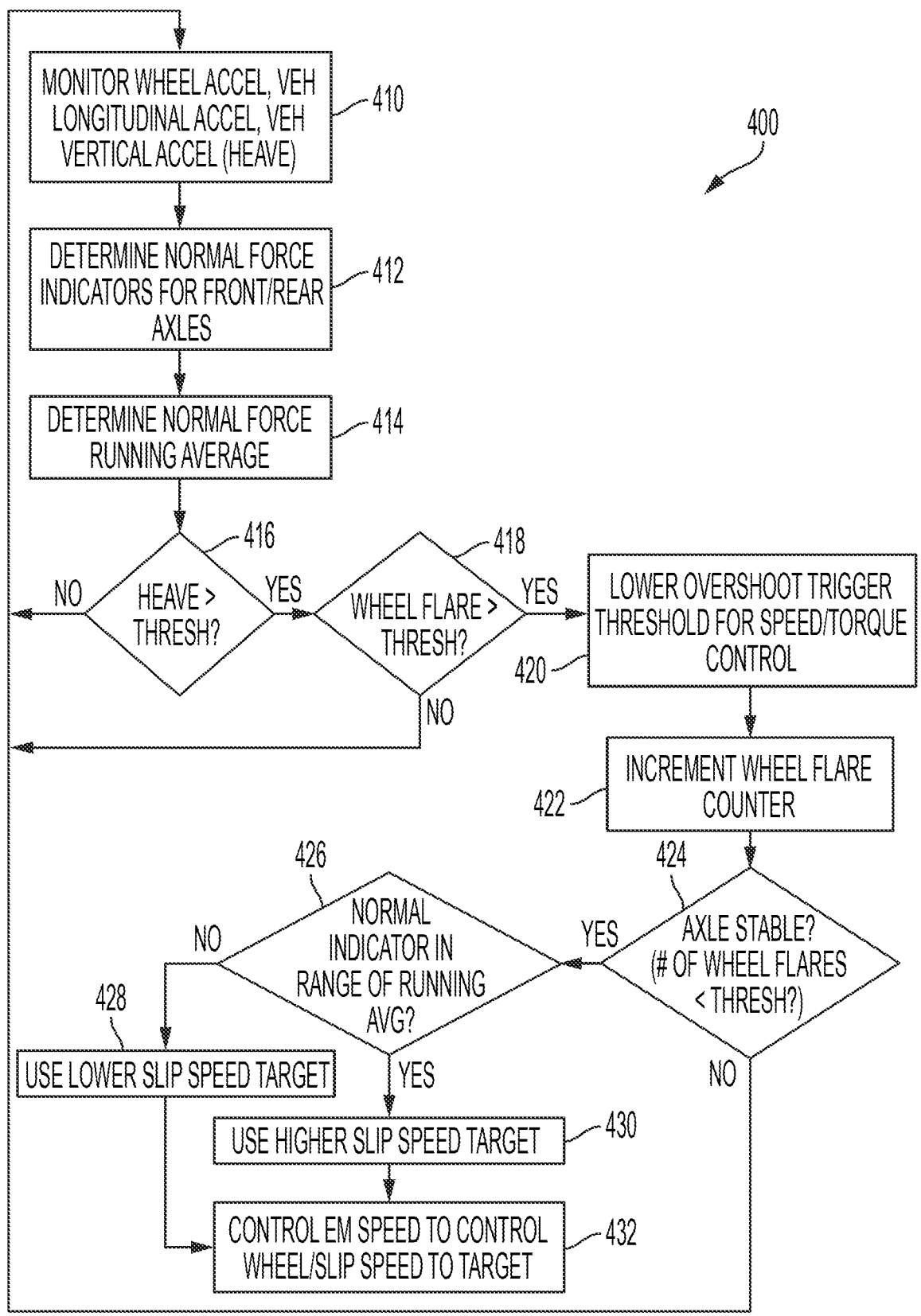
FIG. 4 is a flowchart illustrating operation of a system or method for heave-based wheel speed control of an electrified vehicle.

As illustrated and described in greater detail with respect to FIGS. 2-4, a control strategy is employed in an off-road drive mode for electrified vehicle 100 that uses wheel speeds or angular accelerations and a predefined vertical acceleration (typically referred to as heave) of the vehicle 100 to estimate where each axle is in the compression and rebound process when going over a bump or jump 120. The algorithm may use a ratio between wheel angular acceleration (rad/s$^2$) changes and changes in vehicle longitudinal acceleration 126 (m/s$^2$) to identify or detect when each axle goes over the bump 120 and matches this to a heave event based on the vertical acceleration exceeding a corresponding threshold to calculate or otherwise determine a normal force indicator 124. The normal force indicator is a calculated variable within the control strategy that may be calculated using known methods. The normal force indicator 124 represents the downward Force (N) on the wheels that may be used to estimate when wheel slip/flare will occur. Axle stability may be determined based on the normal indicator being outside of a range of a predetermined specified value or a running average of values, for example.

In various embodiments, when wheel flare is accompanied by a heave event a flag is sent to the wheel speed controller to optionally lower the overshoot trigger threshold for the speed controller to force the axle into speed control before significant wheel flare occurs. Based on the stability of the axle (number of wheel slip events during a predetermined time period), speed control is blended between a high wheel slip speed target while the normal force indicator stays within a stable window (running average+/−tolerance) for a specified time period. When the normal force indicator is outside the stability window, the wheel slip speed target for the wheels of the associated axle is reduced to a value greater than zero that still provides some propulsion but does not rapidly clear out soil. As previously described, embodiments of this disclosure work differently than traditional traction control, which cuts torque drastically on deformable surfaces to reduce slip to zero causing the vehicle to stop very quickly. For optimal tractive force, some wheel slip over ground speed should be maintained and electric motor speed control is highly effective at doing this compared to various prior art brake and engine control strategies.

FIG. 2 is a schematic diagram of a representative electrified vehicle. Representative electrified vehicle 100' is a hybrid electric vehicle (HEV) in this example that includes an engine 254, an electric machine 256, differentials 258, 280 and wheels 260, 262, 264, 266. Differential 258 and wheels 264, 266 are associated with a front axle 210, while differential 258 and wheels 260, 262 are associated with a rear axle 220. Differentials 258, 280 may be independently driveable and controllable. Stated differently, wheel speeds of front wheels 264, 266 associated with front axle 210 and differential 280 may be independently controllable relative to wheel speeds of rear wheels 260, 262 associated with rear axle 220 and differential 258 depending on the particular application and implementation. Similarly, while representative electrified vehicle 100' is represented as an HEV, wheel slip speed control as described herein is equally applicable to other types of electrified vehicles having one or more electric machines controlled to control wheel speed of one or more associated vehicle wheels. For example, a battery electric vehicle (BEV) would not include an engine 254. Embodiments may also include vehicles that have individual electric machines associated with each vehicle wheel 260, 262, 264, 266, or an electric machine associated with each axle 210, 220, for example.

The vehicle 100' includes a traction battery 268, one or more controllers 270, and sensors 272 (that may include a user-selectable driving mode input to select off-road mode, an accelerator pedal position sensor, brake pedal position sensor, lateral acceleration sensor, longitudinal acceleration sensor, vertical acceleration sensor, steering angle sensor, wheels speed sensors, yaw rate sensor, etc.). Heavy solid lines indicate mechanical coupling, light solid lines indicate electrical coupling, and dashed lines indicate communication. Each of the engine 254 and electric machine 256 is arranged to provide propulsive torque to the wheels 260, 262 via an associated differential 258, and to wheels 265, 266 via an associated differential 280. The traction battery 268 is arranged to provide energy to and receive energy from the electric machine 256. The controller(s) 270 are in communication with and/or command the engine 254, electric machine(s) 256, traction battery 268, and sensors 272. Differentials 258, 280 may be implemented by torque vectoring differentials controlled by controller(s) 270 in some applications.

Control logic or functions performed by controller(s) 270 may be represented by flow charts or similar diagrams in one or more figures, such as the diagrams of FIGS. 3-5. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, electric machine, and/or powertrain controllers, represented controller(s) 270. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

As described in greater detail with respect to FIGS. 3 and 4, controller(s) 270 are programmed to, when vertical acceleration of vehicle 100' exceeds a first threshold, and a ratio of a wheel angular acceleration of wheel 260 or 264 (for rear axle 220) or of wheel 264 or 266 (for front axle 220) to vehicle longitudinal acceleration exceeds a second threshold, control the electric machine 256 to limit wheel slip to a first value, and to control the electric machine 256 to limit wheel slip to a second value otherwise.

FIG. 3 is a block diagram 300 of a control system for setting wheel slip speed control targets and triggering speed control mode of an electric machine in an electrified vehicle. Block 310 determines a normal force indicator (N) based on wheel angular acceleration 312 for each of the front wheels, wheel angular acceleration 314 for each of the rear wheels, vehicle longitudinal acceleration 316, and vehicle vertical acceleration or heave 318. The normal force indicator represents the downward force (N) on the wheels. A separate normal force indicator may be calculated for each wheel, each axle, and/or the vehicle depending on the particular application and implementation. The normal force may be calculated by known methods. Block 310 may also detect a heave event based on the vehicle vertical acceleration exceeding a corresponding threshold, and detect wheel flare events based on wheel angular acceleration exceeding a corresponding threshold. The algorithm monitors the ratio between front wheel 312 and rear wheel 314 angular accelerations (rad/s$^2$) changes and changes in longitudinal acceleration 316 (m/s') to verify when each axle goes over a bump and matches this to a heave event based on vertical acceleration 318 to generate the corresponding normal force indicators. Each normal force indicator is a calculated variable within the control strategy and determined using known vehicle parameters and relationships.

When wheel flare is accompanied by a heave event a flag is generated at block 310 and sent to the corresponding speed controllers 330, 350 to optionally lower the overshoot trigger threshold as represented at 320, 340 for the speed controllers 330, 350, respectively. When the wheel speed flare exceeds the associated overshoot trigger, the powertrain transitions from torque control to speed control for the associated axle before significant wheel flare occurs. Block 310 provides the corresponding normal force indicators for the front wheels 322 to the front wheel speed controllers 330 and normal force indicators for the real wheels 342 to the rear wheel speed controllers 350.

Based on the stability of the corresponding axle as determined by the number of wheel slip/flare events during a predetermined time period, front wheel speed controllers 330 determine a front speed mode request 334 and a front speed control target 336. Similarly, rear wheel speed controllers 350 determine a rear speed mode request 354 and rear speed control target 356. The speed mode request and speed target is used to control speed of an associated electric machine in a speed control mode using a feedback and/or feedforward control system as generally understood by those of ordinary skill in the art.

The speed control targets 336, 356 may be blended between a higher wheel slip speed while the normal force indicators are within a stable window which corresponds to a tolerance or range of a running average of normal force values for a predetermined window or time, and a lower (non-zero) wheel slip speed during periods where the normal force indicators 322, 342 are outside of the stability window or range. The lower wheel slip speed target is reduced to a value that still provides some propulsion of the vehicle but does not rapidly clear out soil as previously described.

As generally understood by those of ordinary skill in the art, control system or algorithm 300 may be used to generate target values for wheel speed or wheel slip speed, which is based on angular wheel speed and wheel diameter relative to vehicle speed. In one embodiment, a ratio of wheel angular acceleration to vehicle longitudinal acceleration is compared to a threshold and the lower wheel slip speed target is used to limit wheel slip when the ratio exceeds the threshold. The higher wheel slip speed target is used otherwise. Wheel slip speed may be controlled by controlling the electric machine speed driving the associate wheel(s) relative to the vehicle speed.

FIG. 4 is a flowchart illustrating operation 400 of a system or method for heave-based wheel speed control of an electrified vehicle. Wheel angular accelerations, vehicle longitudinal acceleration, and vehicle vertical acceleration (heave) are monitored as represented at 410. Accelerations may be determined based on signals from corresponding speed or acceleration sensors, or may be calculated or inferred using data from one or more other vehicle sensor. One or more normal force indicators are determined at block 412. Normal force indicators may be determined for each wheel, for each axle, and/or for the vehicle with each normal force indicator calculated as previously described. A normal force running average may be determined over a period of time or window as represented at 414. The vehicle vertical acceleration or heave is compared to a corresponding threshold at 416. If heave exceeds the corresponding threshold, a corresponding flag may be set to indicate detection of a heave event for a predetermined time period at 416.

Block 418 compares wheel speed flare to a corresponding threshold. Wheel speed flare or overshoot may be calculated based on the change in angular acceleration of the wheel. In response to detecting wheel speed flare at 418, the overshoot trigger threshold that determines whether to operate the electric machine in speed control mode or torque control mode may optionally be lowered as represented at 420. A corresponding wheel flare counter is incremented at 422 for use in determining axle stability at 424. If the number of wheel speed flares within a predetermined time period exceeds a corresponding threshold at 424. If the axle is stable as determined at 424, then block 426 determines whether the corresponding normal force indicator is within a predetermined range or tolerance of a running average of normal force indicator values at 426. If the normal force indicator associated with a particular axle is outside a stability window or predetermined range as indicated at 426, then the lower wheel slip speed target value is used as indicated at 428. Otherwise, the higher wheel slip speed target value is used as indicated at 430. The controller then controls the speed of the electric machine to the selected target as indicated at 432.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. A vehicle comprising:
an electric machine;
a traction battery coupled to the electric machine; and
a controller programmed to:
when vehicle vertical acceleration exceeds a first threshold, and a ratio of a wheel angular acceleration to vehicle longitudinal acceleration exceeds a second threshold, control the electric machine to limit wheel slip to a first value; and
control the electric machine to limit wheel slip to a second value otherwise.

2. The vehicle of claim 1 wherein the controller is further programmed to control speed of the electric machine when limiting the wheel slip to either the first value or the second value.

3. The vehicle of claim 2 wherein the second value is greater than the first value.

4. The vehicle of claim 1 wherein the vehicle comprises a front axle having two associated front wheels, the front axle being independently driveable by the electric machine relative to a rear axle having two associated rear wheels.

5. The vehicle of claim 4 wherein the controller is programmed to limit the wheel slip of the front axle independently of the wheel slip of the rear axle.

6. The vehicle of claim 4 wherein the wheel slip for each of the front and rear axles is based on the higher one of the angular accelerations of the two associated wheels.

7. The vehicle of claim 1 wherein the controller is further programmed to lower an overshoot trigger threshold of a wheel speed controller in response to the vehicle vertical acceleration exceeding the first threshold and the wheel angular acceleration exceeding a third threshold, and wherein the controller is programmed to control torque of the electric machine when wheel speed overshoot is less than the overshoot trigger threshold.

8. The vehicle of claim 1 wherein the controller is further programmed to control the electric machine to limit the wheel slip to the second value in response to a number of wheel slip events during a predetermined time being less than a corresponding axle stability threshold.

9. The vehicle of claim 8 wherein the controller is further programmed to control the electric machine to limit the wheel slip to the first value in response to a normal force indicator being outside a predetermined range of a running average of normal force indicator values.

10. The vehicle of claim 1 further comprising an engine selectively coupled to the electric machine.

11. A system comprising:
an electric machine powered by a traction battery to drive vehicle wheels; and
a controller configured to:
control speed of the electric machine to control wheel slip speed of at least one of the vehicle wheels to a first target value greater than zero in response to vehicle vertical acceleration indicating a heave event and vehicle longitudinal acceleration being below an acceleration threshold; and control speed of the electric machine to control wheel slip speed of at least one of the vehicle wheels to a second target value greater than the first target value when the heave event is detected and a normal force indicator is within a predetermined range of a running average of normal force indicator values.

12. The system of claim 11 wherein the controller is further configured to control torque of the electric machine in response to wheel speed overshoot being less than an associated overshoot threshold.

13. The system of claim 12 wherein the controller is further configured to reduce the overshoot threshold in response to the heave event.

14. The system of claim 13 wherein the wheel slip speed is based on a ratio of wheel angular acceleration of one of the vehicle wheels to vehicle longitudinal acceleration.

15. A method for controlling an electrified vehicle having an electric machine coupled to a traction battery and configured to drive vehicle wheels, the method comprising, by a vehicle controller:

for a predetermined time after detecting a heave event:
controlling speed of the electric machine to control wheel slip speed of one of the vehicle wheels to a higher target value while a normal force indicator is within a predetermined range; and
controlling speed of the electric machine to control wheel slip speed of one of the vehicle wheels to a lower target value greater than zero if the normal force indicator is outside the predetermined range.

16. The method of claim 15 further comprising reducing a wheel speed overshoot trigger in response to a wheel speed flare exceeding a threshold.

17. The method of claim 16 further comprising controlling torque of the electric machine before detecting a heave event.

18. The method of claim 15 wherein the normal force indicator represents downward force on the vehicle wheels.

19. The method of claim 15 further comprising detecting a heave event in response to vehicle vertical acceleration exceeding an associated threshold.

20. The method of claim 19 wherein the heave event is detected only after user input indicative of off-road operation.

* * * * *